US012214589B2

(12) United States Patent
Landa et al.

(10) Patent No.: US 12,214,589 B2
(45) **Date of Patent: *Feb. 4, 2025**

(54) INDIRECT PRINTING SYSTEM

(71) Applicant: LANDA CORPORATION LTD., Rehovot (IL)

(72) Inventors: Benzion Landa, Nes Ziona (IL); Aharon Shmaiser, Rishon LeZion (IL); Alon Siman-Tov, Or Yehuda (IL); Alon Levy, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,460

(22) Filed: Apr. 21, 2023

(65) Prior Publication Data

US 2023/0364905 A1 Nov. 16, 2023

Related U.S. Application Data

(63) Continuation of application No. 17/551,219, filed on Dec. 15, 2021, now Pat. No. 11,660,857, which is a (Continued)

(30) Foreign Application Priority Data

Mar. 20, 2015 (GB) ..................................... 1504716

(51) Int. Cl.
*B41J 2/01* (2006.01)

(52) U.S. Cl.
CPC ............ *B41J 2/01* (2013.01); *B41J 2002/012* (2013.01)

(58) Field of Classification Search
CPC .............................. B41J 2/01; B41J 2002/012
See application file for complete search history.

(56) References Cited

U.S. PATENT DOCUMENTS 7,419,257 B2 9/2008 Mouri et al.
8,362,108 B2 1/2013 Imai
(Continued)

FOREIGN PATENT DOCUMENTS

CN 102675962 B 6/2015
DE 102012011783 A1 12/2013
(Continued)

OTHER PUBLICATIONS

Co-pending U.S. Appl. No. 18/545,483, filed Dec. 19, 2023.
(Continued)

*Primary Examiner* — Lam S Nguyen
(74) *Attorney, Agent, or Firm* — Momentum IP; Marc Van Dyke

(57) ABSTRACT

An indirect printing system is disclosed having an intermediate transfer member (ITM) in the form of an endless belt that circulates during operation to transport ink images from an image forming station. Ink images are deposited on an outer surface of the ITM by one or a plurality of print bars. At an impression station, the ink images are transferred from the outer surface of the ITM onto a printing substrate. In some embodiments, the outer surface of the ITM 20 is maintained within the image forming station at a predetermined distance from the one or each of the print bars 10, 12, 14 and 16 by means of a plurality of support rollers 11, 13, 15, 17 that have a common flat tangential plane and contact the inner surface of the ITM. In some embodiments, the inner surface of the ITM is attracted to the support rollers, the attraction being such that the area of contact between the ITM and each support roller is greater on the downstream side than the upstream side of the support roller, referenced to the direction of movement of the ITM.

19 Claims, 8 Drawing Sheets

Related U.S. Application Data continuation of application No. 16/784,208, filed on Feb. 6, 2020, now Pat. No. 11,235,568, which is a continuation of application No. 15/556,324, filed as application No. PCT/IB2016/051560 on Mar. 20, 2016, now Pat. No. 10,596,804.

(56) References Cited

U.S. PATENT DOCUMENTS

| | | | |
|---|---|---|---|
| 8,632,147 | B2 | 1/2014 | Onishi |
| 9,044,932 | B2 | 6/2015 | Ohnishi et al. |
| 9,969,182 | B2 | 5/2018 | Torisaka et al. |
| 10,052,865 | B2 | 8/2018 | Goto |
| 10,336,060 | B2 | 7/2019 | Liu |
| 11,655,382 | B2 | 5/2023 | Landa et al. |
| 11,660,857 | B2 | 5/2023 | Landa et al. |
| 2004/0105971 | A1 | 6/2004 | Parrinello et al. |
| 2005/0074260 | A1 | 4/2005 | King et al. |
| 2006/0175559 | A1 | 8/2006 | Fischer et al. |
| 2006/0284950 | A1 | 12/2006 | Kessler |
| 2008/0101895 | A1 | 5/2008 | Holcomb et al. |
| 2008/0295724 | A1 | 12/2008 | Lohweg et al. |
| 2012/0183756 | A1 | 7/2012 | Higuchi |
| 2012/0280447 | A1 | 11/2012 | Kayanuma |
| 2013/0016156 | A1 | 1/2013 | Ooishi et al. |
| 2015/0097906 | A1 | 4/2015 | Beier et al. |
| 2016/0274519 | A1 | 9/2016 | Lim et al. |
| 2017/0282599 | A1 | 10/2017 | Ido |
| 2018/0037044 | A1 | 2/2018 | Stowe et al. |
| 2018/0281382 | A1 | 10/2018 | Umezawa et al. |
| 2019/0232638 | A1 | 8/2019 | Ziegenbalg et al. |
| 2020/0073301 | A1 | 3/2020 | Sakai et al. |
| 2020/0361715 | A1 | 11/2020 | Meier |
| 2020/0376860 | A1 | 12/2020 | Paker et al. |
| 2022/0176693 | A1 | 6/2022 | Landa et al. |
| 2023/0166495 | A1 | 6/2023 | Burkatovsky |
| 2023/0202162 | A1 | 6/2023 | Landa et al. |
| 2023/0202209 | A1 | 6/2023 | Guttman et al. |
| 2023/0382101 | A1 | 11/2023 | Landa et al. |

FOREIGN PATENT DOCUMENTS

| | | | |
|---|---|---|---|
| JP | H01142811 | A | 6/1989 |
| JP | H05249870 | A | 9/1993 |
| JP | H08272224 | A | 10/1996 |
| JP | 2003107819 | A | 4/2003 |
| JP | 2003227549 | A | 8/2003 |
| JP | 3712547 | B2 | 11/2005 |
| JP | 2007111891 | A | 5/2007 |
| JP | 2009000916 | A | 1/2009 |
| JP | 2009258587 | A | 11/2009 |
| JP | 2010076214 | A | 4/2010 |
| JP | 2010100012 | A | 5/2010 |
| JP | 2012081770 | A | 4/2012 |
| JP | 2013199114 | A | 10/2013 |
| JP | 2016007841 | A | 1/2016 |
| JP | 2018202867 | A | 12/2018 |
| JP | 2021055093 | A | 4/2021 |
| WO | 2015036865 | A1 | 3/2015 |
| WO | 2019012456 | A1 | 1/2019 |
| WO | 2019111223 | A1 | 6/2019 |
| WO | 2020003088 | A1 | 1/2020 |
| WO | 2020136517 | A1 | 7/2020 |
| WO | 2020141465 | A1 | 7/2020 |
| WO | 2021137063 | A1 | 7/2021 |

OTHER PUBLICATIONS

JP2013199114A Machine Translation (by EPO and Google)—published Oct. 3, 2013; Canon KK.

JP2021055093A Machine Translation (by EPO and Google)—published Apr. 8, 2021; Riso Kagaku Corp.

Co-pending U.S. Appl. No. 18/016,343, inventors Levanon; Moshe et al., filed Jan. 15, 2023.

Co-pending U.S. Appl. No. 18/107,874, filed Feb. 9, 2023.

Co-pending U.S. Appl. No. 18/203,030, filed May 29, 2023.

DE102012011783A1 Machine Translation (by EPO, PlatPat and Google)—published Dec. 19, 2013; Heidelberger Druckmasch AG.

JP2003107819A Machine Translation (by EPO and Google)—published Apr. 9, 2003; Kanegafuchi Chemical Ind.

JP2003227549A Machine Translation (by EPO, PlatPat and Google)—published Aug. 15, 2003; Xerox Corp.

JP2007111891A Machine Translation (by EPO and Google)—published May 10, 2007; Mitsubishi Heavy Ind Ltd.

JP2009000916A Machine Translation (by EPO and Google)—published Jan. 8, 2009; Fujifilm Corp.

JP2009258587A Machine Translation (by EPO and Google)—published Nov. 5, 2009; Fuji Xerox Co Ltd.

JP2010076214A Machine Translation (EPO, PlatPat and Google) published on Apr. 8, 2010 Fuji Xerox Co Ltd.

JP2012081770A Machine Translation (EPO, PlatPat and Google) published on Apr. 26, 2012 Komori Printing Mach.

JP3712547B2 Machine Translation (EPO, PlatPat and Google) published on Nov. 2, 2005 Sasaya Shunji.

JPH01142811A Machine Translation (by EPO and Google)—published Jun. 5, 1989; Fanuc Ltd.

JPH05249870A Machine Translation (by EPO, PlatPat and Google)—published Sep. 28, 1993; Matsushita Electric Ind Co Ltd.

JPH08272224A Machine Translation (by EPO, PlatPat and Google)—published Oct. 18, 1996; Ricoh KK.

CN102675962B Machine Translation (by EPO and Google)—published Jun. 17, 2015; Fuji Photo Film Co Ltd.

Co-pending U.S. Appl. No. 18/743,386, filed Jun. 14, 2024.

JP2010100012 Machine Translation (English machine translation)—published May 6, 2010 Fuji Xerox Co Ltd.

JP2016007841A Machine Translation (by EPO and Google)—published Jan. 18, 2016; Ricoh Co Ltd.

JP2018202867A Machine Translation (by EPO and Google)—published Dec. 27, 2018; Canon KK.

INDIRECT PRINTING SYSTEM

CROSS-REFERENCE TO RELATED APPLICATIONS

This application is a continuation of U.S. patent application Ser. No. 17/551,219 filed on Dec. 15, 2021 which is incorporated by reference for all purposes as if fully set forth herein. U.S. patent application Ser. No. 16/784,208, filed on Feb. 6, 2020 and incorporated by reference for all purposes as if fully set forth herein, is a continuation of U.S. patent application Ser. No. 15/556,324. U.S. patent application Ser. No. 15/556,324 is a national stage entry of PCT/IB2016/051560 which was filed on Mar. 20, 2016, which is incorporated by reference for all purposes as if fully set forth herein.

FIELD OF THE INVENTION

The invention relates to an indirect printing system having an intermediate transfer member (ITM) in the form of an endless belt for transporting ink images from an image forming station, where the ink images are deposited on an outer surface of the ITM by at least one print bar, to an impression station where the ink images are transferred from the outer surface of the ITM onto a printing substrate.

BACKGROUND OF THE INVENTION

An example of a digital printing system as set out above is described in detail in WO 2013/132418 which discloses use of a water-based ink and an ITM having a hydrophobic outer surface.

In indirect printing systems, it is common to wrap the ITM around a support cylinder or drum and such mounting ensures that, at the image forming station, the distance of the ITM from the print bars does not vary. Where, however, the ITM is a driven flexible endless belt passing over drive rollers and tensioning rollers, it is useful to take steps to ensure that the ITM does not flap up and down, or is otherwise displaced, as it passes through the image forming station and that its distance from the print bars remains fixed.

In WO 2013/132418, the ITM is supported in the image forming station on a flat table and it is proposed to use negative air pressure and lateral belt tensioning to maintain the ITM in contact with its support surface. In some systems, employing such construction may create a high level of drag on the ITM as it passes through the image forming station.

In WO 2013/132418, it is also taught that to assist in guiding the belt smoothly, friction may be reduced by passing the belt over rollers adjacent each print bar instead of sliding the belt over stationary guide plates. The rollers need not be precisely aligned with their respective print bars. They may be located slightly (e.g. few millimeters) downstream of the print head jetting location. Frictional forces are used to maintain the belt taut and substantially parallel to print bars. To achieve this, the underside of the belt has high frictional properties and the lateral tension is applied by the guide channels sufficiently to maintain the belt flat and in contact with rollers as it passes beneath the print bars.

Some systems rely on lateral tension to maintain the belt in frictional engagement with the rollers to prevent the belt from lifting off the rollers at any point across. Nevertheless, in some systems, this may increase (even severely) the drag on the belt and wear of the guide channels.

SUMMARY

By supporting the ITM during its passage through the image forming station without severely increasing the drag on the ITM, it is possible to avoid flapping of the ITM, thereby maintaining its surface at a fixed predetermined distance from the print bars. This may be accomplished by a plurality of support rollers that have a common flat tangential plane and contact the inner surface of the ITM.

According to embodiments of the present invention, there is provided an indirect printing system having an intermediate transfer member (ITM) in the form of a circulating endless belt for transporting ink images from an image forming station, where the ink images are deposited on an outer surface of the ITM by at least one print bar, to an impression station where the ink images are transferred from the outer surface of the ITM onto a printing substrate, wherein the outer surface of the ITM is maintained within the image forming station at a predetermined distance from the at least one print bar by means of a plurality of support rollers that have a common flat tangential plane and contact the inner surface of the ITM, and wherein the inner surface of the ITM is attracted to the support rollers, the attraction being such that the area of contact between the ITM and each support roller is greater on the downstream side than the upstream side of the support roller, referenced to the direction of movement of the ITM. The attraction of the ITM to each support roller is sufficient to cause the section of the ITM disposed immediately downstream of the support roller to be deflected downwards, away from the common tangential plane of the support rollers.

In some embodiments of the invention, the inner surface of the ITM and the outer surface of each support roller are formed of materials that tackily adhere to one another, adhesion between the outer surface of each support roller and the inner surface of the ITM serving to prevent the ITM from separating from the support rollers, during operation, when the belt circulates.

The support rollers may have smooth or rough outer surfaces and the inner surface of the ITM may be formed of, or coated with, a material that tackily adheres to the surfaces of the support rollers.

The material on the inner surface of the ITM may be a tacky silicone-based material, which may be optionally supplemented with filler particles to improve its mechanical properties.

In some embodiments of the invention, the attraction between the inner surface of the ITM and the support rollers may be caused by suction. Each support roller may have a perforated outer surface, communicating with a plenum within the support roller that is connected to a vacuum source, so that negative pressure attracts the inner surface of the ITM to the rollers. A stationary shield may surround, or line, part of the circumference of each support roller so that suction is only applied to the side of the roller facing the ITM.

In some embodiments of the invention, the attraction between the support rollers and the ITM may be magnetic. In such embodiments, the inner surface of the ITM may be rendered magnetic (in the same way as fridge magnets) so as to be attracted to ferromagnetic support rollers. Alternatively, the inner surface of the ITM may be loaded with ferromagnetic particles so as to be attracted to magnetized support rollers.

Each print bar may be associated with a respective support roller and the position of the support roller in relation to the print bar may be such that, during operation, ink is deposited by the print bar onto the ITM along a narrow strip upstream from the contact area between the ITM and the support roller.

A shaft or linear encoder may be associated with one or more of the support rollers, to determine the position of the ITM in relation to the print bars.

According to some embodiments, each print bar is associated with a respective support roller and the position of the associated support roller in relation to the print bar is such that, during operation, ink is deposited by the print bar onto the ITM along a narrow strip upstream from the contact area between the ITM and the support roller.

According to some embodiments a shaft or linear encoder is associated with one or more of the support rollers to determine the position of the ITM in relation to the print bars.

According to some embodiments, the indirect printing system comprises a plurality of the print bars such that a different respective support roller is located below and vertically aligned with each print bar of the plurality of print bars.

According to some embodiments, for each given print bar of the plurality of print bars, a respective vertically-aligned support roller is disposed slightly downstream of the given print bar.

According to some embodiments, each given support roller of the plurality of support rollers is associated with a respective rotational-velocity measurement device and/or a respective encoder for measuring a respective rotational-velocity of the given support roller.

An indirect printing system having an intermediate transfer member (ITM) in the form of a circulating endless belt for transporting ink images from an image forming station is now disclosed. According to embodiments of the invention, the ink images are deposited on an outer surface of the ITM by at a plurality of print bars, to an impression station where the ink images are transferred from the outer surface of the ITM onto a printing substrate, wherein the outer surface of the ITM is maintained within the image forming station at a predetermined vertical distance from the print bars by a plurality of support rollers that have a common flat tangential plane and contact the inner surface of the ITM, the support rollers being disclosed such that a different respective support roller is located below and vertically aligned with each print bar of the plurality of print bars, wherein each given support roller of the plurality of support rollers is associated with a respective rotational-velocity measurement device and/or a respective encoder for measuring a respective rotational-velocity of the given support roller.

According to some embodiments, for each given print bar of the plurality of print bars, a respective vertically-aligned support roller is disposed slightly downstream of the given print bar.

According to some embodiments, the indirect printing system further comprises: droplet-deposition control circuitry configured to regulate, for each given print bar of the plurality of print bars, a respective rate of ink droplet deposition DR onto the ITM, the droplet-deposition control circuitry regulating the ink droplet deposition rates in accordance with and in response to the measured of the rotational velocity of a respective support rollers that is vertically aligned with the given print bar.

In some embodiments, the measurement device and/or the encoder is attached (i.e. directly or indirectly attached) to its respective roller (e.g. via a shaft thereof).

According to some embodiments, for upstream and downstream print bars respectively vertically aligned with upstream and downstream support rollers, the droplet-deposition control circuit regulates the respective $DR_{UPSTREAM}$, $DR_{DOWNSTREAM}$ deposition rates at upstream and downstream print bars so that a difference $DR_{UPSTREAM}-DR_{DOWNSTREAM}$ between respective ink-droplet-deposition-rates at upstream and downstream print bars is regulated according to a difference function between function $F=\omega_{UPSTREAM}*R_{UPSTREAM}-\omega_{DOWNSTREAM}*R_{DOWNSTREAM}$ where: i. $\omega_{UPSTREAM}$ is the measured rotation rate of the upstream-printbar-aligned support roller as measured by its associated rotational-velocity measurement device or encoder; ii. $R_{UPSTREAM}$ is the radius of the upstream-printbar-aligned support roller; iii. $\omega_{DOWNSPREAM}$ is the measured rotation rate of the downstream-printbar-aligned support roller as measured by its associated rotational-velocity measurement device or encoder; and ii. $R_{DOWNSTREAM}$ is the radius of the upstream-printbar-aligned support roller.

BRIEF DESCRIPTION OF THE DRAWING

The invention will now be described further, by way of example, with reference to the accompanying drawings, in which.

Figure 1:
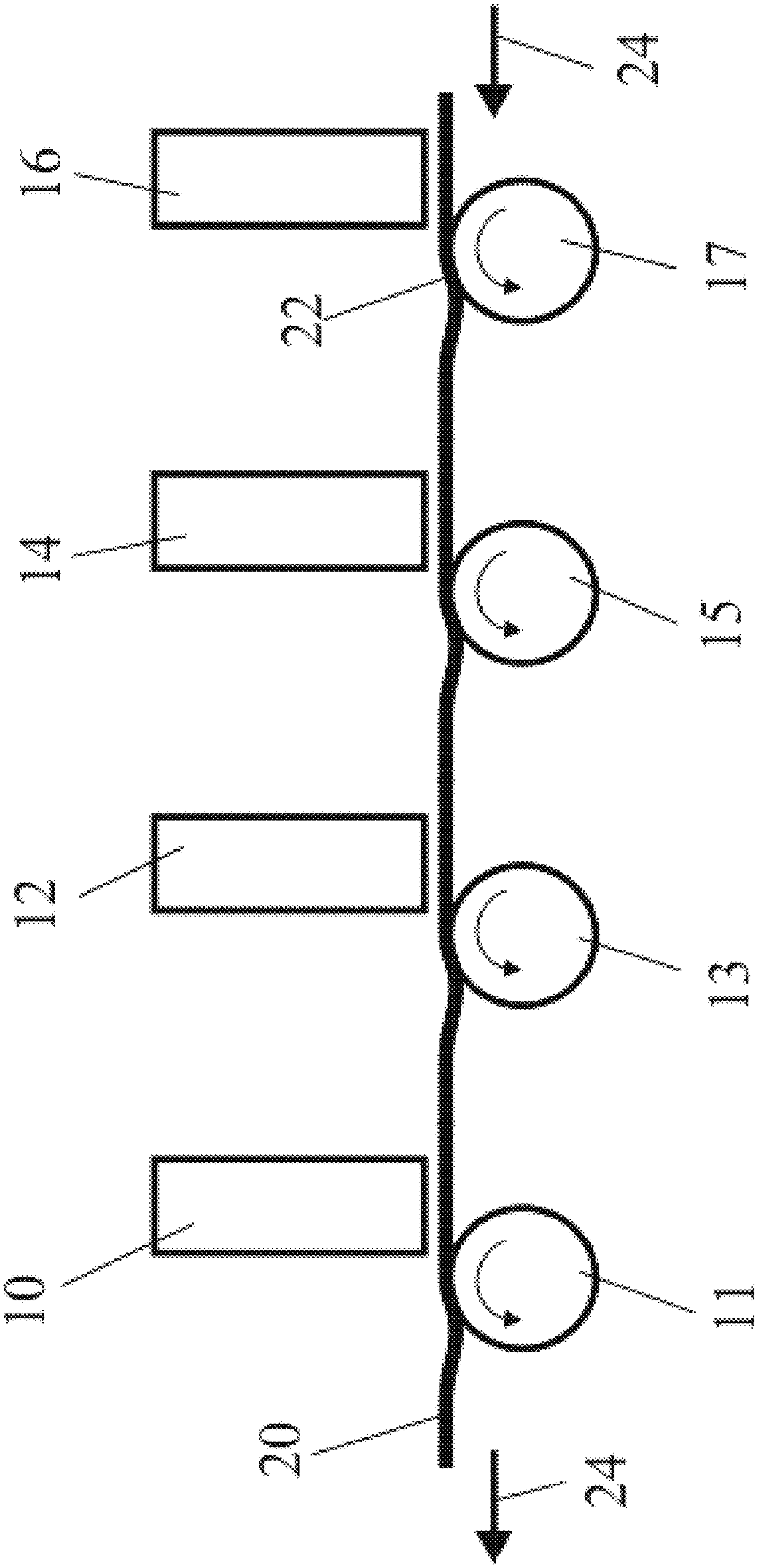
FIGS. 1, 3 and 4 each schematically illustrate an image transfer member passing beneath four print bars of an image forming station.

It will be appreciated that the drawings area only intended to explain the principles employed in the present invention and illustrated components may not be drawn to scale.

DETAILED DESCRIPTION OF THE DRAWING

FIG. 1 shows an image transfer member (ITM) 20 passing beneath four print bars 10, 12, 14, 16 of an image forming station of a digital printing system, for example of the kind described in WO 2013/132418. The print bars 10, 12, 14, 16 deposit ink droplets onto the ITM which are dried while being transported by the ITM and are transferred to a substrate at an impression station (not shown). The direction of movement of the ITM from the image forming station to the impression station, illustrated by arrow 24 in the drawing, is also termed the printing direction. The terms upstream and downstream are used herein to indicate the relative position of elements with reference to such printing direction.

Multiple print bars can be used either for printing in multiple colors, for example CMYK in the case of the four print bars shown in the drawing, or to increase printing speed when printing in the same color. In either case, accurate registration is required between the ink droplets deposited by different print bars and for this to be achieved it is necessary to ensure that the ITM lie in a well defined plane when ink is being deposited onto its surface.

In the illustrated embodiment, cylindrical support rollers 11, 13, 15 and 17 are positioned immediately downstream of the respective bars 10, 12, 14 and 16. A common horizontal plane, spaced form the print bars by a desired predetermined distance, is tangential to all the support rollers. The rollers 11, 13, 15 and 17 contact the underside of the ITM 20, that is to say the side facing away from the print bars.

To ensure that the ITM 20 does not flap as it passes over the rollers 11, 13, 15 and 17, the rollers in FIG. 1 may have smoothly polished surfaces and the underside of the ITM may be formed of, or coated with, a soft conformable silicone-based material that tackily adheres to smooth surfaces. Such materials are well known and are in a wide commercial use, for example, in children's toys. There are for example figures made of such materials that will adhere to a vertical glass pane when pressed against it.

Because of the tacky contact between the ITM 20 and the roller 11, 13, 15 and 17, it will be seen in the drawing that the ITM is deflected downwards from the notional horizontal tangential plane on the downstream or exit side of each roller 11, 13, 15 and 17. Thus, the contact area 22 between the ITM 20 and each roller 11, 13, 15 and 17, lies predominantly on the downstream, or exit, side of the roller. The tension applied to the ITM in the printing direction ensures that the ITM returns to the desired plane before it reaches the subsequent print bar 10, 12, or 14.

The sticking of the ITM 20 to the support rollers is relied upon to ensure that the ITM does not lift off the rollers. As the rollers are supported on bearings and are free to rotate smoothly, the only drag on the ITM, other than the force required to overcome the resistance of the bearing and maintain the momentum of the support rollers, is the small force required to separate the tacky underside of the ITM from each of the support rollers 11, 13, 15 and 17.

The regions of the ITM in contact with the uppermost points on each roller 11, 13, 15 and 17 and the regions immediately upstream of each roller lie in the nominal tangential plane and can be aligned with the print bars 10, 12, 14 and 16. However, if any foreign body, such as a dirt particle, should adhere to the tacky underside of the ITM 20 it will cause the upper surface of the ITM to bulge upwards as it passes over a support roller. For this reason, it is preferred to position the print bars 10, 12, 14 and 16 upstream of the vertical axial plane of the rollers 11, 13, 15 and 17, that is to say offset upstream from regions of the ITM in contact with the rollers.

If the tacky adhesion between the ITM 20 and the support rollers 11, 13, 15 and 17 is excessive, it can result in drag and wear of the ITM 20. It is possible to moderate the degree of drag by suitable selection of the hardness of the tacky material or by modification of the roughness of the support rollers 11, 13, 15 and 17.

The attraction in FIG. 1 between the ITM 20 and the support rollers 11, 13, 15 and 17 may rely on magnetism instead of tackiness. In such embodiments, the inner surface of the ITM 20 may be rendered magnetic so as to be attracted to ferromagnetic support rollers 11, 13, 15 and 17. Alternatively, the inner surface of the ITM 20 may be loaded with ferromagnetic particles so as to be attracted to magnetized support rollers 11, 13, 15 and 17.

Figure 2:
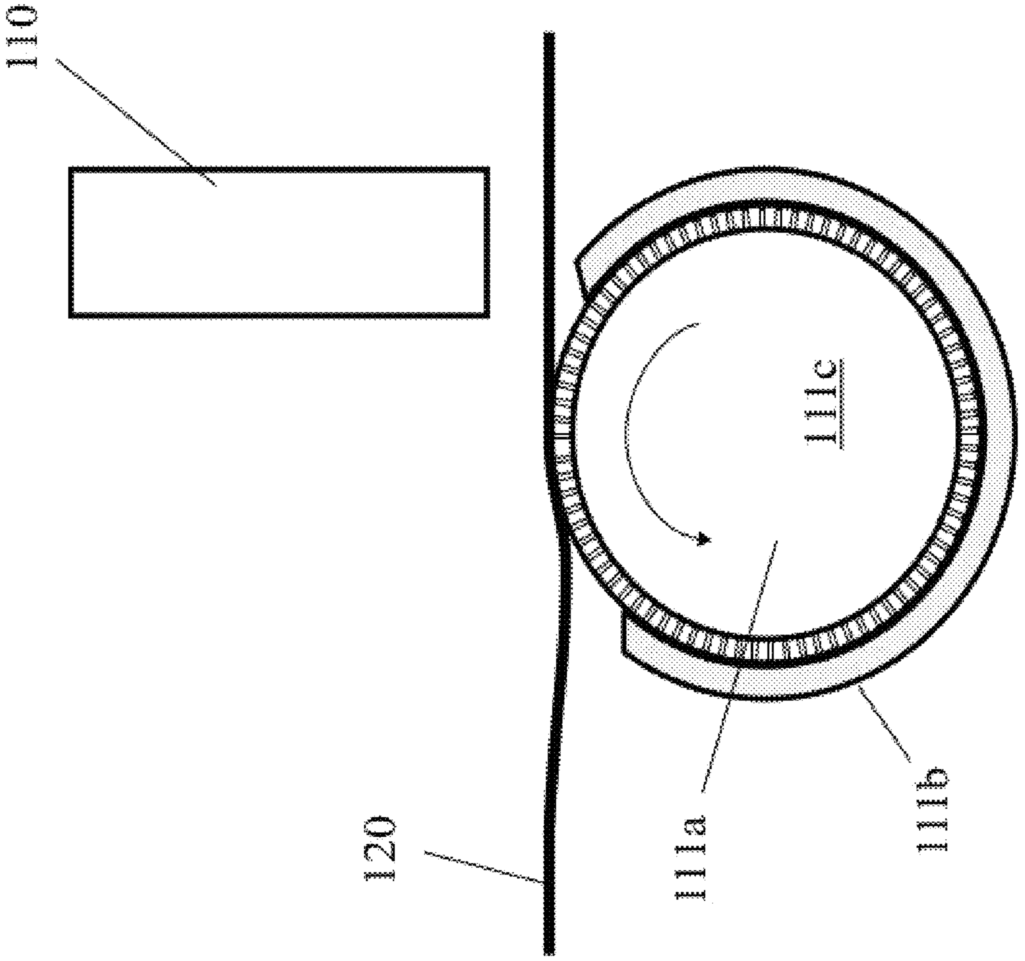
FIG. 2 is a section through an embodiment in which the ITM is attracted to a support roller by application of negative pressure from within the support roller.

FIG. 2 shows schematically a further alternative embodiment in which the attraction between the inner surface of the ITM 120 and a support roller assembly generally designated 111 is the result of negative pressure applied through the support roller assembly 111 to the inner surface of the ITM 120 while the outer surface of the ITM 120 is under atmospheric pressure.

The illustrated support roller assembly 111 comprises a support roller 111*a* surrounded around a major part of its circumference by a stationary shield 111*b*. The roller 111*a* has a perforated surface and is hollow, its inner plenum 111*c* being connected to a vacuum source. The function of the shield 111*b* is to prevent the vacuum in the support roller 111*a* from being dissipated and to concentrate all the suction in the arc of the support roller 111*a* adjacent to and facing the inner surface of the ITM 120. Seals may be provided between the support roller 111*a* and the shield 111*b* to prevent air from entering into the plenum 111*c* through other than the exposed arc of the support roller 111*a*.

As an alternative to a shield 111*b* surrounding the outside of the support roller 111*a*, it would be possible to provide a stationary shield lining the interior of the support roller 111*a*.

Figure 3:
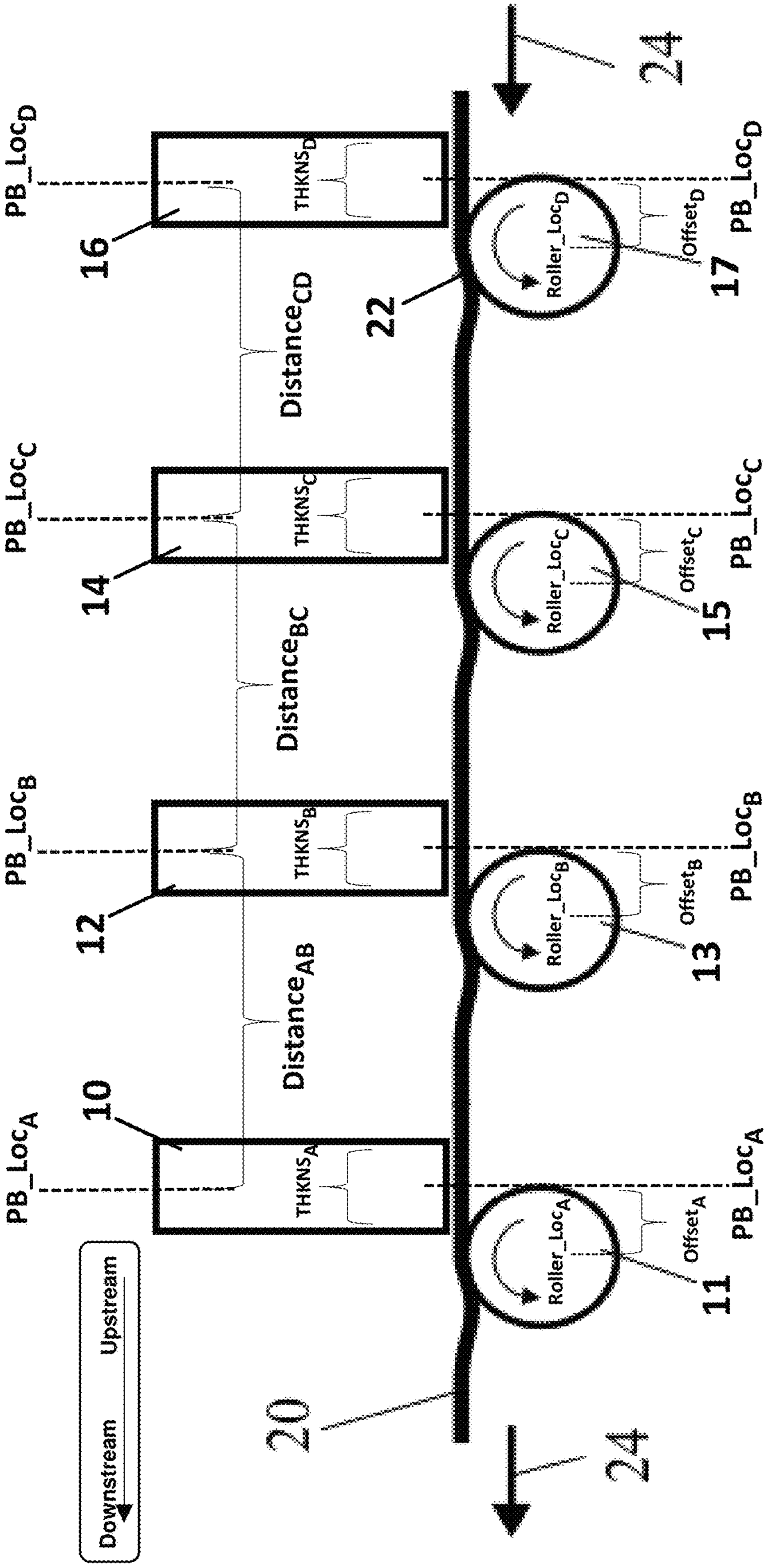

FIG. 3 illustrates the same system illustrated in FIG. 1 comprising print bars 10, 12, 14 and 16 respectively having (i) centers whose positions are labelled as $PB\_Loc_A$, $PB\_Loc_B$, $PB\_Loc_C$, and $PB\_Loc_D$. where PB is an abbreviation for "Print Bar" and Loc is an abbreviation for "Locations"; and (ii) thicknesses that are labelled as $THKNS_A$, $THKNS_B$, $THKNS_C$, and $THKNS_D$. The distances between neighboring print bars are labelled as $Distance_{AB}$, $Distance_{BC}$, and $Distance_{CD}$.

The 'center' of a print bar is a vertical plane oriented in the cross-print direction.

In some embodiments, $THKNS_A=THKNS_B=THKNS_C=THKNS_D$, though this is not a limitation, and in other embodiments there may be a variation in print bar thickness. In some embodiments, the print bars are evenly spaced so that $Distance_{AB}=Distance_{BC}=Distance_{CD}$— once again, this is not a limitation and in other embodiments the distances between neighboring print bars may vary.

In some embodiments, each print bar is associated with a respective support roller that is located below the support roller and vertically aligned with the support roller.

For the present disclosure, when a support roller 13 is 'vertically aligned' with an associated print bar 12, a center of the support roller 13 may be exactly aligned (i.e. in the print direction illustrated by 24) with the centerline $PB\_LOC_B$ of the associated print bar 12. Alternatively, if there is a 'slight' horizontal displacement/offset in the print direction (e.g. a downstream offset of the support roller relative to its associated print bar) between the center of the support roller 13 and a center of the associated print bar 12, the print bar 12 and support roller 13 are still considered to be 'vertically aligned' with each other.

FIG. 3 illustrates horizontal displacements/offsets $Offset_A$, $Offset_B$, $Offset_C$, and $Offset_D$ in the print direction between center of each print bar 10, 12, 14, 16 and its respective support roller 11, 13, 15 and 17. However, because the print bars and the support rollers are 'vertically aligned'; this displacement/offset is at most 'slight.' The term 'slight' or 'slightly displaced/offset' (used interchangeably) are defined below.

In the non-limiting example, all of the support rollers have a common radius—this is not a limitation, and embodiments where the radii of the support rollers differ are also contemplated.

In one particular example, the radius of each support roller 11, 13, 15, and 17 is 80 mm, the center-center distance ($Distance_{AB}=Distance_{BC}=Distance_{CD}$) between neighboring pairs of print bars is 364 mm, the thickness ($THKNS_A=THKNS_B=THKNS_C=THKNS_D$) of each print bar is 160 mm, and the offset distances ($Offset_A=Offset_B=Offset_C$, $=Offset_D$.) between the center of the print bar and the center of its associated roller is 23 mm.

Print bars 10 and 16 are 'end print bars' which each have only a single neighbor—the neighbor of print bar 10 is print bar 12 and the neighbor of print bar 16 is print bar 14. In contrast, print bars 12, 14 are 'internal print bars' having two neighbors. Each print bar is associated with a closest neighbor distance—for print bar 10 this is $Distance_{AB}$, for print bar 12 this is MIN($Distance_{AB}$, $Distance_{BC}$) where MIN denotes the minimum, for print bar 14 this is MIN(Distance$_{BC}$, Distance$_{CD}$) and for print bar 16 this is Distance$_{CD}$.

For the present disclosure, when the support roller is 'slightly displaced/offset' from its associated print bar, this means that a ratio α between the (i) the offset/displacement distance "Offset" defined by the centers of the support roller and the print bar and (ii) the closest neighbor distance of the print bar is at most 0.25. In some embodiments, the ratio α is at most 0.2 or at most 0.15 or at most 0.1. In the particular example described above, the ratio α is 23/364=0.06.

In some embodiments, in order to achieve accurate registration between ink droplets deposited by different print bars, it is necessary to monitor and control the position of the ITM not only in the vertical direction but also in the horizontal direction. Because of the adhesive nature of the contact between the rollers and the ITM, the angular position of the rollers can provide an accurate indication of the position of the surface of the ITM in the horizontal direction, and therefore the position of ink droplets deposited by preceding print bars. Shaft encoders may thus suitably be mounted on one or more of the rollers to provide position feedback signals to the controller of the print bars.

In some embodiments, the length of the flexible belt or of portions thereof may fluctuate in time, where the magnitude of the fluctuations may depend upon the physical structure of the flexible belt. In some embodiments, the stretching and contracting of the belt may be non-uniform. In these situations, the local linear velocity of the ITM at each print bar may vary between print bars due to stretching and contracting of the belt or of the ITM in the print direction. Not only may the degree of stretch may be non-uniform along the length of the belt or ITM, but it may temporally fluctuate as well.

Registration accuracy may depend on having an accurate measure of the respective linear velocity of the ITM underneath each print bar. For systems where the ITM is a drum or a flexible belt having temporally constant and spatially uniform stretch (and thus a constant shape), it may be sufficient to measure the ITM speed at a single location.

However, in other systems (e.g. when the ITM stretches and contracts non-uniformly in space and in a manner that fluctuates in time), the linear speed of the ITM under a first print bar 10 at PB_Loc$_A$ may not match the linear speed under a second print bar 12 at PB_Loc$_B$. Thus, if the linear speed of the ITM at the downstream print bar 10 exceeds that of the ITM at the upstream bar 12 this may indicate that the blanket is locally extending (i.e. increasing a local degree of stretch) at locations between the two print bars 10, 12. Conversely, if the linear speed of the ITM at the downstream print bar 10 is less than that of the ITM at the upstream bar 12 this may indicate that the blanket is locally contracting at locations between the two print bars 10, 12.

Registration may thus benefit from obtaining an accurate measurement of the local speed of the ITM at each print bar. Instead of only relying on a single ITM-representative velocity value (i.e. like may be done for a drum), a "print-bar-local" linear velocity of the ITM at each print bar may be measured at a location that is relatively 'close' to the print bar center PB_LOC.

Figure 4:
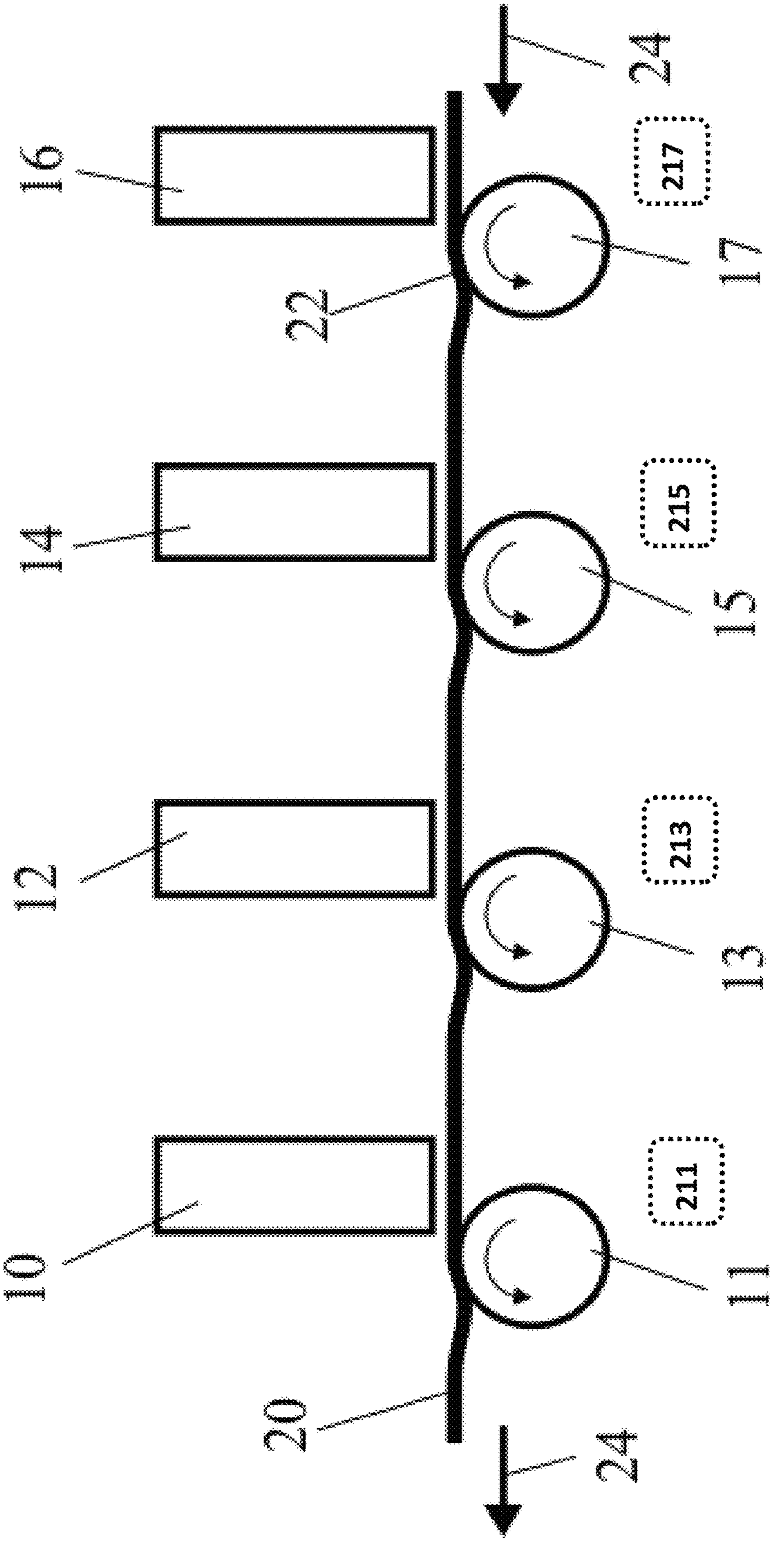

For example, as shown in FIG. 4, a respective device (e.g. for example, a shaft-encoder) 211, 213, 215 or 217 may be used to measure the respective rotational velocity ω of each support roller—this rotational velocity, together with the radius of the support roller, may describe the local linear velocity of each support roller. Because the support roller is vertically aligned with the print bar, this rotational velocity, together with the radius of the support roller, may provide a relatively accurate measurement of the linear velocity of the ITM beneath the print bar.

FIG. 4 illustrates the rotational-velocity measuring device schematically. As is known in the art (e.g. art of shaft encoders), the rotational-velocity measuring device 211, 213, 215 or 217 may including mechanical and/or electrical and/or optical and/or magnetic or any other components to monitor the rotation of the support roller. For example, the rotational-velocity measuring device 211, 213, 215 or 217 may directly monitor rotation of the roller or of a rigid object (e.g. a shaft) that is rigidly attached to the roller and that rotates in tandem therewith.

Because the ITM may be locally stretch or contract over time, depositing ink-droplets only according to a single 'ITM-representative' speed for all print bars may lead to registration errors. Instead, it may be advantageous to locally measure the linear speed of the ITM at each print bar.

Towards this end, the support rollers may serve multiple purposes—i.e. supporting the ITM in a common tangential plane and measuring the speed of the ITM at a location where the ITM is in contact with (e.g, no-slip contact—for example, due the inner surface being attached to the support rollers—for example, due to the presence of a tacky material on the ITM inner surface) with the support roller.

In order for the support roller to provide an accurate measurement of the linear speed of the ITM beneath the print bar, it is desirable to vertically align the support roller with its associated print bar. Towards this end, it is desirable to locate the support roller so the value of the ratio α (defined above) is relatively small.

In some embodiments, a ratio β between (i) the offset/displacement distance "Offset" defined by the centers of the support roller and the print bar and (ii) a thickness TKNS of the print bar is at most 1 or at most 0.75 or at most 0.5 or at most 0.4 or at most 0.3 or at most 0.2. In the example described above, a value of the ratio β is 23 mm/160 mm=0.14.

In some embodiments, a ratio γ between (i) a diameter of the vertically aligned support roller and (ii) a thickness TKNS of the print bar is at most 2 or at most 1.5 or at most 1.25. In the example described above, a value of the ratio β is 160 mm/160 mm=1.

In some embodiments, a ratio δ between (i) a diameter of the vertically aligned support roller and (ii) the closest neighbor distance of the associated print bar at most 1 or at most 0.75 or at most 0.6 or at most 0.5. In the example described above, a value of the ratio β is 160 mm/364 mm=0.44.

Figure 5:
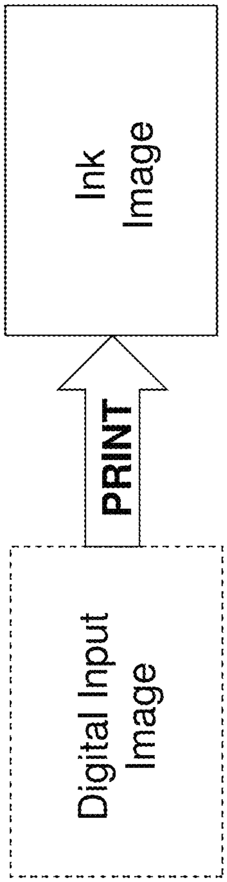
FIG. 5 shows converting a digital input image into an ink image by printing.

FIG. 5 is a generic figure illustrating any printing process—a digital input image is stored in electronic or computer memory (e.g. as a two-dimensional array of gray-scale values) and this 'digital input image' is printed by the printing system to yield an ink image on the ITM.

Each print bar deposits droplets of ink upon the ITM at a respective deposition-rate that depends upon (i) content of the digital input image being printed and (ii) the speed of the ITM as it moves beneath the print bar. The 'deposition rate' is the rate at which ink droplets are deposited on the ITM 20 and has the dimensions of 'number of droplets per unit time' (e.g. droplets per second).

Figure 6:
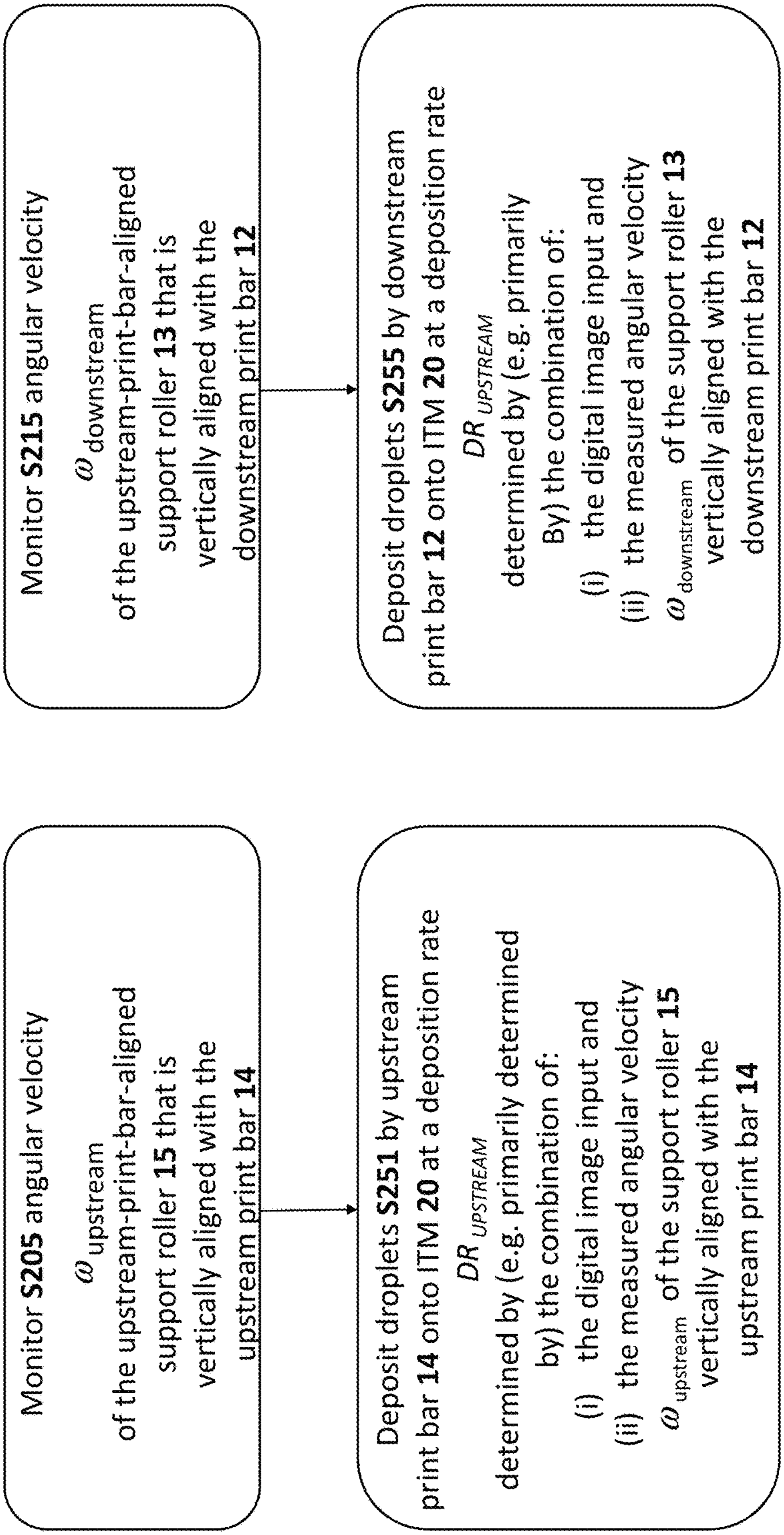
FIGS. 6-8 shows methods for printing by an upstream and a downstream print bar in accordance with angular velocities of support rollers.

FIG. 6 illustrates a method of operating upstream 14 and downstream 12 print bars according to some embodiments. In step S205, an angular velocity $\omega_{UPSTREAM}$ of support roller 15 is monitored; similarly (e.g. simultaneously), in step S215, an angular velocity $\omega_{DOWNSTREAM}$ of support roller 13 is monitored. In step S251, droplets of ink are deposited on the ITM 20 by upstream print bar 14 at a rate determined (e.g. determined primarily) by the combination of (i) the digital input image; and (ii) $\omega_{UPSTREAM}$ In step S255, droplets of ink are deposited on the ITM 20 by downstream print bar 12 at a rate determined (e.g. determined primarily) by the combination of (i) the digital input image; and (ii) $\omega_{DOWNSTREAM}$.

It is understood that due to temporal fluctuations in non-uniform stretching of the ITM, the linear velocities of the ITM at the upstream 14 and downstream 12 print bars will not always match. These linear velocities may be approximately and respectively monitored by monitoring the linear velocities (i) at the contact location between upstream support roller 15 (i.e. vertically aligned with the upstream 14 print bar) and (ii) at the contact location between downstream support roller 13 (i.e. vertically aligned with the downstream 12 print bar).

Notation—the angular velocity of the upstream support roller 15 is $\omega_{UPSTREAM}$, the angular velocity of the downstream support roller 13 is $\omega_{DOWNSTREAM}$, the linear velocity of the ITM 20 at the contact location between the ITM 20 and the upstream support roller 15 is denoted at $LV_{UPSTREAM}$; the linear velocity of the ITM 20 at the contact location between the ITM 20 and the upstream support roller 15 is denoted at $LV_{UPSTREAM}$. An ink-droplet deposition rate of the upstream 14 print bar is denoted as $DR_{UPSTREAM}$ and an ink-droplet deposition rate of the downstream 12 print bar is denoted as $DR_{DOWNSTREAM}$. $R_{UPSTREAM}$ is the radius of the upstream support roller 15; $R_{DOWNSTREAM}$ is the radius of the downstream support roller 13.

In some embodiments, a rate of ink droplet deposition DR at any of the print bars is regulated by electronic circuitry (e.g. control circuitry). For the present disclosure, the term 'electronic circuitry' (or control circuitry such as droplet-deposition control circuitry) is intended broadly to include any combination of analog circuitry, digital circuitry (e.g. a digital computer) and software.

For example, the electronic circuitry may regulate the ink droplet deposition rate DR according to and in response to electrical input received directly or indirectly (e.g. after processing) from any rotation-velocity measuring device (e.g. shaft-encoder 211, 213, 215 or 217).

For the present paragraph, assume that $LV_{UPSTREAM}$ is equal to the linear velocity of the ITM directly beneath the upstream print bar 14 and that $LV_{DOWNSTREAM}$ is equal to the linear velocity of the ITM directly beneath the downstream print bar 12—this is a good approximation since (i) any horizontal displacement/offset between the upstream print bar 14 and its associated support roller 15 is at most slight; and (ii) any horizontal displacement/offset between the downstream print bar 12 and its associated support roller 13 is at most slight.

When the upstream and downstream linear velocities match (i.e. when $LV_{UPSTREAM}=LV_{DOWNSTREAM}$), the difference ($DR_{UPSTREAM}-DR_{DOWNSTREAM}$) in respective ink-droplet rates at any given time will be determined primarily by (e.g. solely by) the content of the digital input image. Thus, when printing a uniform input image, when the upstream and downstream linear velocities match, this difference ($DR_{UPSTREAM}-DR_{DOWNSTREAM}$) will be zero and each print bar will deposit ink droplets at a common deposition rate difference $DR_{UPSTREAM}=DR_{DOWNSTREAM}$.

However, due to temporal fluctuations in the non-uniform stretch of the ITM, there may be periods of mismatch between the upstream and downstream linear velocities match—i.e. when $LV_{UPSTREAM}\neq LV_{DOWNSTREAM}$. In order to compensate (e.g. for example, when printing a uniform input-image or a uniform portion of a larger input-image), the greater the difference between the upstream and downstream linear velocities, the greater the difference in ink deposition rates—i.e. as the linear velocity difference $LV_{UPSTREAM}-LV_{DOWNSTREAM}$ increases (decreases), the deposition rate difference $DR_{UPSTREAM}-DR_{DOWNSTREAM}$ increases (decreases).

Assuming no-slip between the ITM 20 and the upstream support roller 15, the magnitude of $LV_{UPSTREAM}$ is the product $\omega_{UPSTREAM}*R_{UPSTREAM}$. Assuming no-slip between the ITM 20 and the downstream support roller 13, the magnitude of $LV_{DOWNSTREAM}$ is the product $\omega_{DOWNSTREAM}*R_{DOWNSTREAM}$. The linear velocity difference $LV_{UPSTREAM}-LV_{DOWNSTREAM}$ is given by $\omega_{UPSTREAM}*R_{UPSTREAM}$ $\omega_{DOWNSTREAM}*R_{DOWNSTREAM}$.

Therefore, in some embodiments the respective ink droplet depositions rates at the upstream 14 and downstream 12 print bar may regulated so that, for at least some digital input images (e.g. uniform images) the difference therebetween in ink droplet deposition rates $DR_{UPSTREAM}-DR_{DOWNSTREAM}$ increases (decreases) as $\omega_{UPSTREAM}*R_{UPSTREAM}$ $\omega_{DOWNSTREAM}*R_{DOWNSTREAM}$ (decreases) increases.

Figure 7:
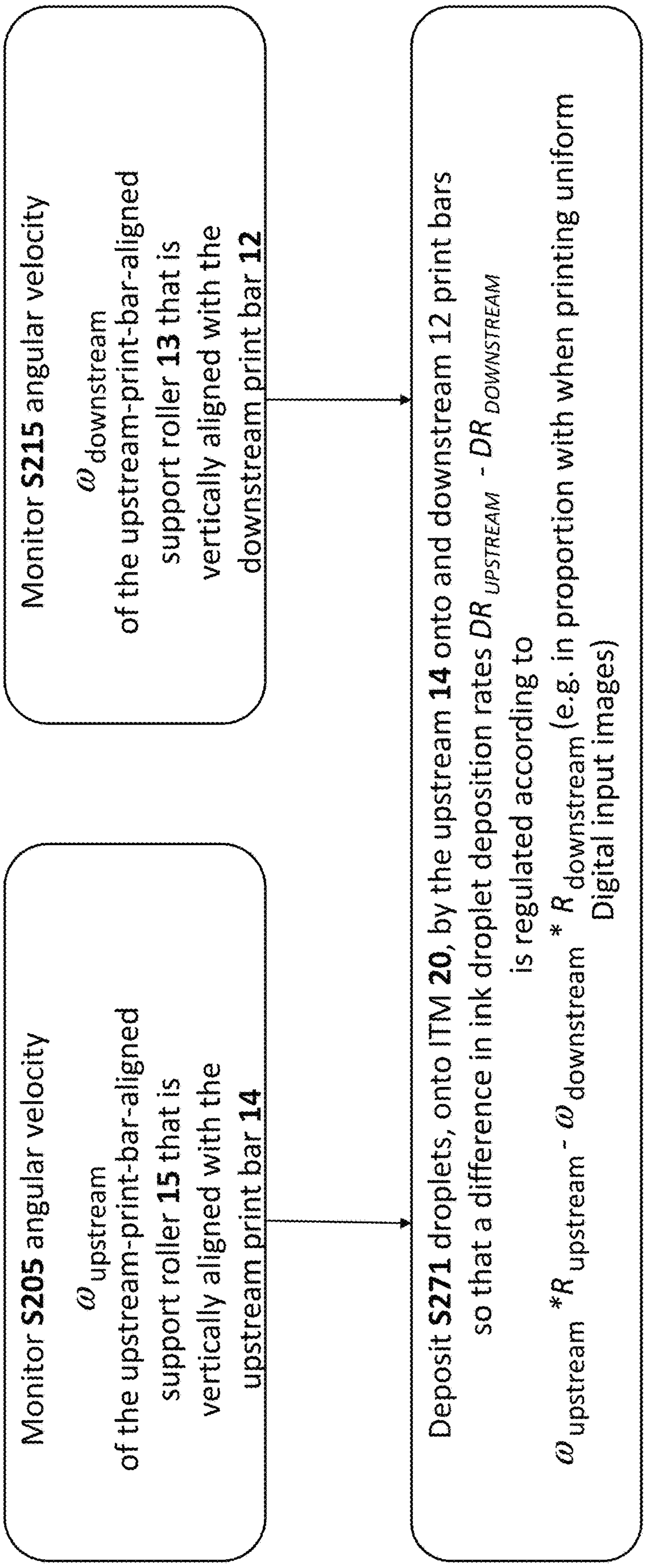

This is illustrated in FIG. 7 where (i) steps S205 and S215 are as in FIG. 6 and (ii) in step S271 droplets are deposited onto ITM 20, by the upstream 14 onto and downstream 12 print bars so that a difference in ink droplet deposition rates $DR_{UPSTREAM}-DR_{DOWNSTREAM}$ is regulated according to $\omega_{upstream}*R_{upstream}-\omega_{downstream}*R_{downstream}$. In one example (e.g. when printing uniform digital input images or uniform portions of a non-uniform digital image), the difference in ink droplet deposition rates $DR_{UPSTREAM}-DR_{DOWNSTREAM}$ in proportion with $\omega_{upstream}*R_{upstream}-\omega_{downstream}*R_{downstream}$. In this example, whenever $\omega_{upstream}*R_{upstream}-\omega_{downstream}*R_{downstream}$ increases (decreases), $DR_{UPSTREAM}-DR_{DOWNSTREAM}$ increases (decreases).

Figure 8:
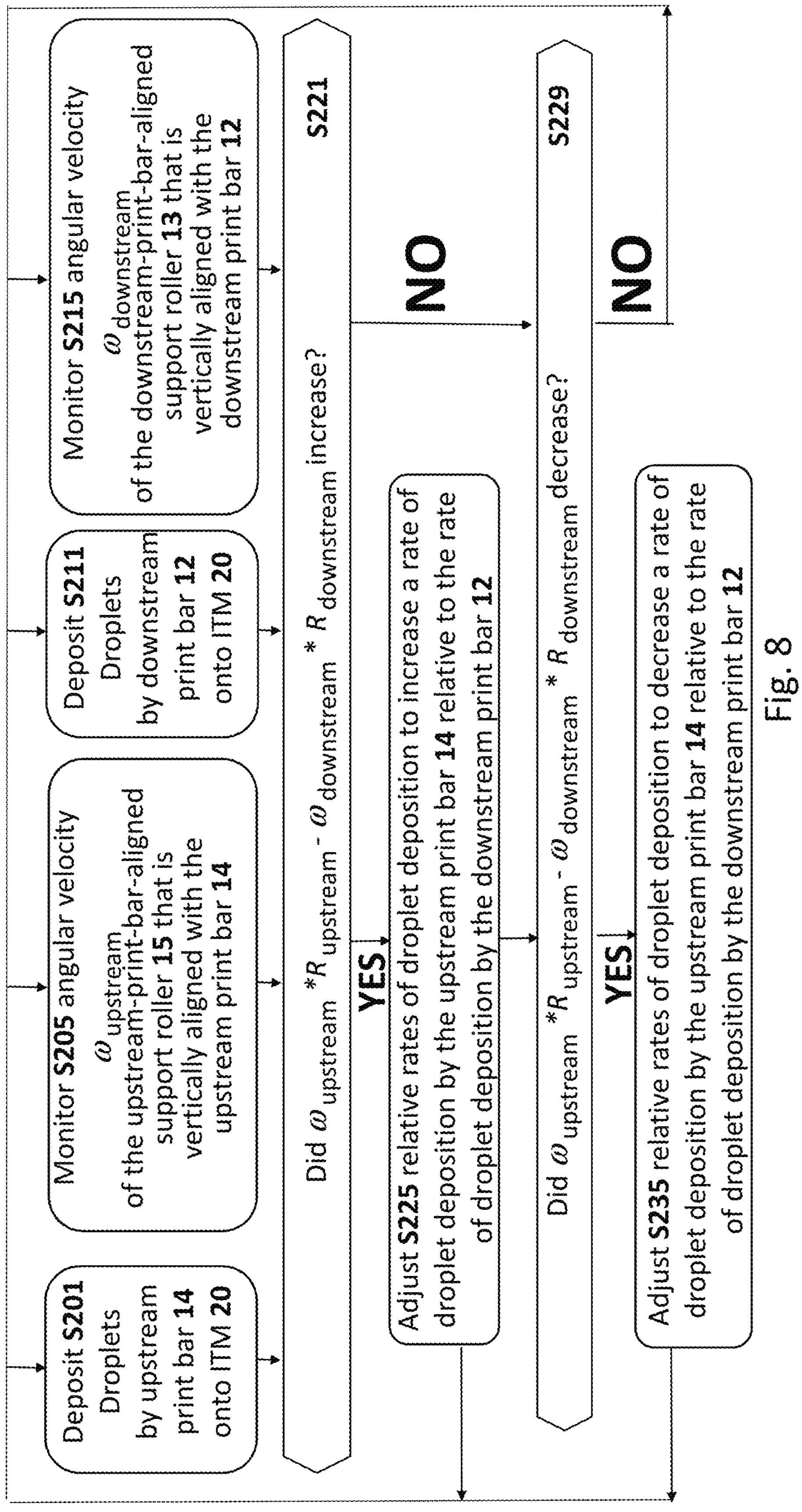

FIG. 8 is another method for depositing ink droplets on ITM 20 where steps S205 and S215 are as in FIGS. 6-7. In steps S201 and S211, droplets are deposited (i.e. at respective deposition rates $DR_{UPSTREAM}$, $DR_{DOWNSTREAM}$) by the upstream 14 and downstream 12 print bars. In steps S221-S225, in response to an increase in $\omega_{upstream}*R-_{upstream}-\omega_{downstream}*R_{downstream}$, $DR_{UPSTREAM}-DR_{DOWNSTREAM}$ increases. In steps S229 and S235, in response to a decrease in $\omega_{upstream}*R_{upstream}-\omega_{downstream}*R_{downstream}$, $DR_{UPSTREAM}-DR_{DOWNSTREAM}$ decreases.

According to some embodiments, for upstream 14 and downstream 12 print bars respectively vertically aligned with upstream 15 and downstream 13 support rollers, the droplet-deposition control circuit regulates the respective $DR_{UPSTREAM}$, $DR_{DOWNSTREAM}$ deposition rates at upstream and downstream print bars so that a difference $DR_{UPSTREAM}-DR_{DOWNSTREAM}$ between respective ink-droplet-deposition-rates at upstream and downstream print bars is regulated according to a difference function between function $F=\omega_{UPSTREAM}*R_{UPSTREAM}-\omega_{DOWNSTREAM}*R_{DOWNSTREAM}$ where: i. $\omega_{UPSTREAM}$ is the measured rotation rate of the upstream-printbar-aligned support roller 13 as measured by its associated rotational-velocity measurement device or encoder 213; ii. $R_{UPSTREAM}$ is the radius of the upstream-printbar-aligned support roller 215; iii. $\omega_{DOWNSTREAM}$ is the measured rotation rate of the downstream-printbar-aligned support roller 15 as measured by its associated rotational-velocity measurement device or encoder 215; and ii. $R_{DOWNSTREAM}$ is the radius of the upstream-printbar-aligned support roller 15.

Embodiments of the present invention relate to encoder devices and/or rotational-velocity measurement devices. The rotational-velocity measurement device and/or encoder device may convert the angular position or motion of a shaft or axle to an analog or digital code. The encoder may be an absolute or an incremental (relative) encoder. The encoder may include any combination of mechanical (e.g. including gear(s)) (e.g. stress-based and/or rheometer-based) and/or electrical (e.g. conductive or capacitive) and/or optical and/or magnetic (e.g. on-axis or off-axis—e.g. including a Hall-effect sensor or magnetoresistive sensor) techniques, or any other technique known in the art.

In different embodiments, the measurement device and/or the encoder may be attached (i.e. directly or indirectly attached) to its respective roller.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Presently-disclosed teachings may be practiced in a system that employs water-based ink and an ITM having a hydrophobic outer surface. However, this is not a limitation and other inks or ITMs may be used.

Although the present invention has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the invention as defined in the appended claims and any change which come within their meaning and range of equivalency.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

As used herein, when a numerical value is preceded by the term "about", the term "about" is intended to indicate +/−10%.

To the extent necessary to understand or complete the disclosure of the present invention, all publications, patents, and patent applications mentioned herein, are expressly incorporated by reference in their entirety as is fully set forth herein.

Citation or identification of any reference in this application shall not be construed as an admission that such reference is available as prior art to the invention.

The invention claimed is:

1. A method of operating an indirect printing system having an intermediate transfer member (ITM) in the form of a circulating endless belt, the method comprising:

at an image forming station of the indirect printing system, depositing ink images on an outer surface of the ITM by a plurality of print bars;

transporting the images from the image forming station to an impression station of the indirect printing system; and at the impression station, transferring the ink images from the outer surface of the ITM onto a printing substrate, wherein the outer surface of the ITM is maintained within the image forming station at a predetermined vertical distance from the print bars by a plurality of support rollers, the support rollers (i) having a common flat tangential plane; and (ii) contacting the inner surface of the ITM, and wherein the method further comprises:

for each given support roller of the plurality of support rollers, respectively applying suction to the ITM so as to cause a respective section of the ITM disposed immediately downstream of the given support roller to be deflected downwards away from the common tangential plane of the support rollers so that respective contact between the ITM and the given support roller is greater on the downstream side than on the upstream side of the given support roller.

2. The method of claim 1 wherein a respective greater suction is applied on a downstream side of the given support roller than on an upstream side thereof.

3. The method of claim 1 wherein suction is only applied to the side of the roller facing the ITM.

4. The method of claim 1 wherein each support roller has a perforated outer surface, communicating with a plenum within the support roller that is connected to a vacuum source.

5. The method claim 4 wherein a stationary shield surrounds, or lines, part of the circumference of each support roller so that suction is only applied to the side of the roller facing the ITM.

6. The method of claim 1 wherein each print bar is associated with a respective support roller and the position of the associated support roller in relation to the print bar is such that, during operation, ink is deposited by the print bar onto the ITM along a narrow strip upstream from the contact area between the ITM and the support roller.

7. The method of claim 1, wherein a shaft or linear encoder is associated with one or more of the support rollers to determine the position of the ITM in relation to the print bars.

8. The method of claim 1, comprising a plurality of the print bars such that a different respective support roller is located below and vertically aligned with each print bar of the plurality of print bars.

9. The method of claim 1 wherein for each given print bar of the plurality of print bars, a respective vertically-aligned support roller is disposed slightly downstream of the given print bar.

10. The indirect printing system as claimed in claim 9 wherein each given support roller of the plurality of support rollers is associated with a respective rotational-velocity measurement device and/or a respective encoder for measuring a respective rotational-velocity of the given support roller.

11. The method of claim 1 further comprising: regulating, for each given print bar of the plurality of print bars, a respective rate of ink droplet deposition DR onto the ITM, the regulating of the ink droplet deposition rates being carried out in accordance with and in response to the measured of the rotational velocity of a respective support rollers that is vertically aligned with the given print bar.

12. The method of claim 11 wherein for upstream and downstream print bars respectively vertically aligned with upstream and downstream support rollers, the regulating of the respective $DR_{UPSTREAM}$, $DR_{DOWNSTREAM}$ deposition rates at upstream and downstream print bars so that a difference $DR_{UPSTREAM}-DR_{DOWNSTREAM}$ between respective ink-droplet-deposition-rates at upstream and downstream print bars is regulated according to a difference function between function $F=\omega_{UPSTREAM}*R_{UPSTREAM}-\omega_{DOWNSTREAM}*R_{DOWNSTREAM}$ where: i. $\omega_{UPSTREAM}$ is the measured rotation rate of the upstream-printbar-aligned support roller as measured by its associated rotational-velocity measurement device or encoder; ii. $R_{UPSTREAM}$ is the radius of the upstream-printbar-aligned support roller; iii. $\omega_{DOWNSTREAM}$ is the measured rotation rate of the downstream-printbar-aligned support roller as measured by its associated rotational-velocity measurement device or encoder; and ii. $R_{DOWNSTREAM}$ is the radius of the upstream-printbar-aligned support roller.

13. A method of operating an indirect printing system having an intermediate transfer member (ITM) in the form of a circulating endless belt, the method comprising:

at an image forming station of the indirect printing system, depositing ink images on an outer surface of the ITM by a plurality of print bars;

transporting the images from the image forming station to an impression station of the indirect printing system; and at the impression station, transferring the ink images from the outer surface of the ITM onto a printing substrate, wherein the outer surface of the ITM is maintained within the image forming station at a predetermined vertical distance from the print bars by a plurality of support rollers, the support rollers (i) having a common flat tangential plane; and (ii) contacting the inner surface of the ITM, and wherein the method further comprises:

for each given support roller of the plurality of support rollers, respectively applying a magnetic force to the ITM so as to cause a respective section of the ITM disposed immediately downstream of the given support roller to be deflected downwards away from the common tangential plane of the support rollers so that respective contact between the ITM and the given support roller is greater on the downstream side than on the upstream side of the given support roller.

14. The method of claim 13 wherein each print bar is associated with a respective support roller and the position of the associated support roller in relation to the print bar is such that, during operation, ink is deposited by the print bar onto the ITM along a narrow strip upstream from the contact area between the ITM and the support roller.

15. The method of claim 13, wherein a shaft or linear encoder is associated with one or more of the support rollers to determine the position of the ITM in relation to the print bars.

16. The method of claim 13, comprising a plurality of the print bars such that a different respective support roller is located below and vertically aligned with each print bar of the plurality of print bars.

17. The method of claim 13 wherein for each given print bar of the plurality of print bars, a respective vertically-aligned support roller is disposed slightly downstream of the given print bar.

18. The method of claim 13 wherein each given support roller of the plurality of support rollers is associated with a respective rotational-velocity measurement device and/or a respective encoder for measuring a respective rotational-velocity of the given support roller.

19. The method of claim 13 further comprising: regulating, for each given print bar of the plurality of print bars, a respective rate of ink droplet deposition DR onto the ITM, the regulating of the ink droplet deposition rates being carried out in accordance with and in response to the measured of the rotational velocity of a respective support rollers that is vertically aligned with the given print bar.

* * * * *